Sept. 6, 1949.    R. DUGDALE    2,481,007
FISHMOUTH SPREADER
Filed Oct. 1, 1947    2 Sheets-Sheet 1
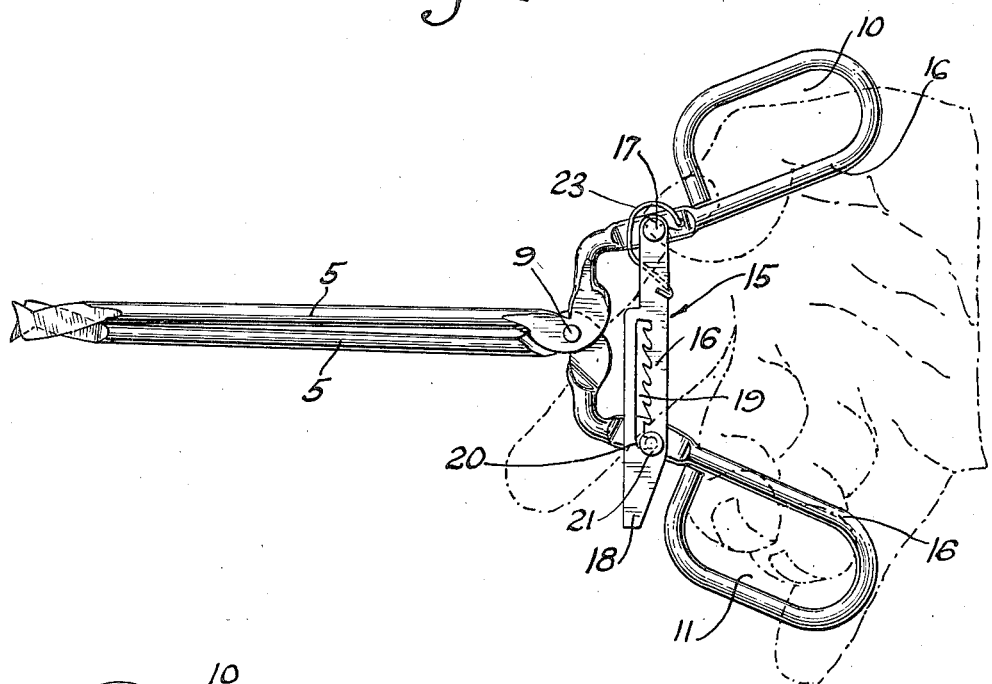
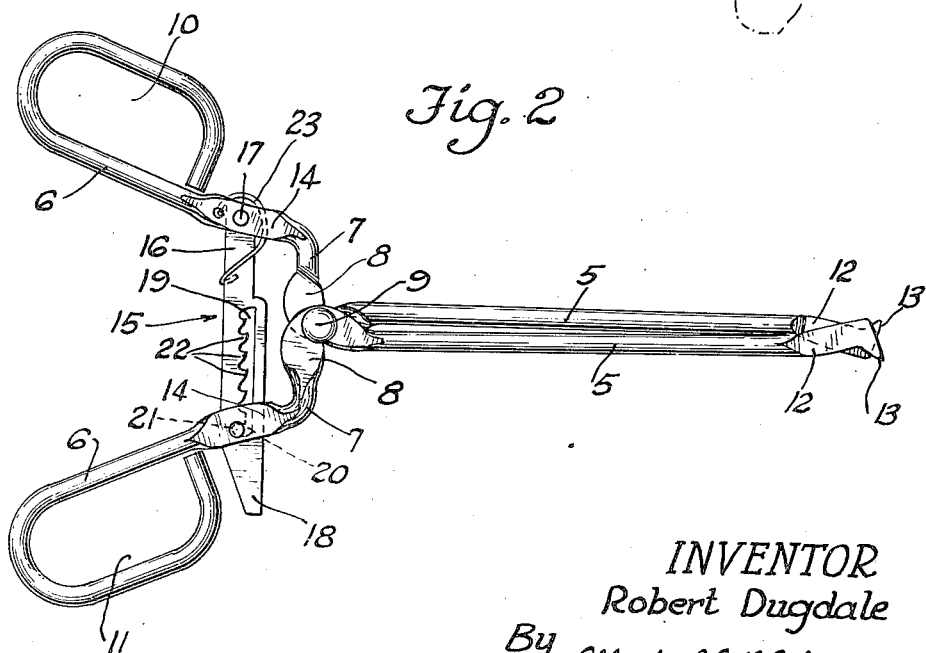
INVENTOR
Robert Dugdale
By Albert G. McCaleb
Attorney Sept. 6, 1949.   R. DUGDALE   2,481,007
FISHMOUTH SPREADER
Filed Oct. 1, 1947   2 Sheets-Sheet 2

INVENTOR
Robert Dugdale
By Albert G. McCaleb
Attorney

Patented Sept. 6, 1949

2,481,007

UNITED STATES PATENT OFFICE 2,481,007

FISH MOUTH SPREADER

Robert Dugdale, Chicago, Ill.

Application October 1, 1947, Serial No. 777,168

1 Claim. (Cl. 43—29)

My invention relates to fish mouth spreaders and is concerned with the provision of a superior device of this class which is easier and safer to use than comparable devices heretofore available and capable of being economically manufactured.

A salient feature of the fish mouth spreader of my invention is a trigger-detent which acts to hold the piercing points of the tool immediately adjacent to each other while they are being projected into the mouth of a fish, and which is controllable by a forefinger of the user while the thumb and other fingers of the same hand are exerting mouth-spreading force upon the hand pieces of the tool.

An important object of my invention is to provide a handy, safe and sturdy fish mouth spreader which may be fashioned very largely from round wire stock.

Other features, objects and advantages of my invention will appear from the following detailed description wherein reference is made to the accompanying two sheets of drawings, in which:

Fig. 1 is an elevation of my fish mouth spreader as viewed from one side thereof;

Fig. 2 is a generally similar view of the other side of the tool;

Fig. 3 is a top plan of the tool; and

Fig. 4 is a view corresponding to Fig. 1 but showing the tool as it appears when locked to hold open the mouth of a fish.

Similar characters of reference refer to similar parts throughout the several views.

The tool of my invention preferably comprises two pieces of round wire stock each conformed to provide an elongated and substantially straight shank 5, a hand piece 6 offset from and at an acute angle to the shank, and the intermediate portion 7 substantially normal to the shank and at an obtuse angle to the hand piece.

Each of the aforementioned intermediate portions 7 is flattened at 8 to facilitate its pivotal connection by rivet pin 9 to the other portion 7.

The free end of each hand piece 6 is return bent to provide a thumb loop 10 or a finger loop 11.

The free end of each shank 5 is flattened at 12 to lie in contiguity to the corresponding end of the other shank and is provided with a piercing point 13.

That portion of each hand piece 6 which extends away from its loops 10 or 11, as the case may be, is flattened as indicated at 14 to cooperate with the trigger-detent indicated in its entirety by reference character 15.

Trigger-detent 15 comprises an elongated bar 16 having one of its ends disposed flat-wise against and pivoted by rivet pin 17 to the flattened hand piece portion which projects away from thumb loop 10. From pin 17 bar 16 extends to and bears flat-wise against the flattened hand piece portion 14 which projects away from the finger loop 11, and then projects substantially beyond said last-mentioned flattened hand piece portion (in all positions of the loops 10 and 11) to provide the trigger proper indicated at 18.

Bar 16 is provided with a longitudinal slot 19 which at the end thereof nearest trigger 18 joins a cove recess 20 which, when the loops 10 and 11 are in positions shown in Figs. 1, 2 and 3, is occupied by a pin 21. Pin 21 protrudes from the flattened hand piece portion which projects from finger loop 11. Slot 19 is provided, on the side thereof nearest the loops 10 and 11, with teeth 22 arranged to cooperate with pin 21 to hold the shank points 13—13 at a plurality of different separated positions. A spring 23 at all times tends to bias trigger 18 away from finger loop 11.

Normally, with my improved fish mouth spreader ready for instant use, the pin 21 occupies cove recess 20 to lock the piercing points 13—13 and the loops 10—11 in the relative positions depicted in Figs. 1, 2 and 3. When it is desired to force open and hold spread the mouth of a fish, the tool is grasped by one hand of the user as depicted by dotted lines in Fig. 1, i. e. with the thumb occupying loop 10, with the second and/or third fingers occupying loop 11 and with the tip of the forefinger lying immediately adjacent to but out of contact with trigger 18. With the piercing points locked in contiguity they are thrust into the mouth of the fish and twisted into proper opposition to the roof and floor of the mouth of the fish; whereupon the trigger is pressed with the fore-finger to release pin 21 from cove recess 20 and the loops 10 and 11 are squeezed together to force the points 13—13 apart to pierce and spread the fish mouth as depicted by dotted lines in Fig. 4. When the mouth has been spread to the extent desired the trigger is released, and bar 16 then is biased by spring 23 to cause one of the teeth 22 to engage pin 21 to lock the piercing points in their separated positions. The tool is rendered readily removable from the mouth of the fish by grasping the tool as before, pressing trigger 18 and moving loops 10 and 11 away from each other to restore the piercing points to their positions in contiguity each to the other.

Having thus illustrated and described a preferred embodiment of my invention what I claim as new, and desire to secure by Letters Patent of the United States, is:

A fish mouth spreader comprising: Two members each formed of a single piece of round wire and each consisting of six portions, namely, an elongated shank of circular cross section, a mouth-entering extremity conformed to present a flat face adapted to lie against the similar face of the mouth-entering extremity of the other member and a piercing point extending away from the piercing point of the mouth-entering extremity of the other member, a pivotal portion conformed to present an L-shaped flat face contacting but reversely disposed with respect to the corresponding face of the other member, an elbow portion of circular cross section interposed between the pivotal portion and the next-to-be-mentioned bar-engaging portion, a bar-engaging portion conformed to present a flat face to the hereinafter mentioned detent bar, and a finger loop located adjacent the last-mentioned flat face; a main pivot pin whereby the aforementioned pivotal portions are articulated with their L-shaped faces in contact; and a detent bar having a flat face that is disposed against the flat face of each of the aforementioned bar-engaging portions, said detent bar being pivoted in face-to-face contact with one of said bar-engaging portions and provided with a laterally notched longitudinal slot receiving a headed pin, for cooperation with the slot notches, by which said bar may be held in different adjustments in face-to-face contact with the other bar-engaging portion; whereby the spreader may be twisted by force applied to its finger loops properly to position its piercing points in the closed mouth of a fish, with but very little strain being sustained by the aforementioned main pivot pin, when the aforementioned mouth-entering extremities are disposed alongside of and in face-to-face contact with each other.

ROBERT DUGDALE.

REFERENCES CITED

The following references are of record in the file of this patent:

UNITED STATES PATENTS

| Number | Name | Date |
|---|---|---|
| 797,541 | Walker et al. | Aug. 15, 1905 |
| 1,952,990 | Kirsch | Mar. 27, 1934 |
| 2,364,953 | Daley | Dec. 12, 1944 |

OTHER REFERENCES

The Dental Cosmos, vol. LXXI, 1929, page 36, Fig. 4, Jaw-separating forceps for gaining access to the mouth. Published by the S. S. White Dental Manufacturing Co., 211 South Twelfth St., Philadelphia, Pa. (Copy in U. S. Patent Office, Scientific Library.)